United States Patent [19]
Ward

[11] 3,784,011
[45] Jan. 8, 1974

[54] AUTOMATIC TRANSMISSION FLUID FILTER

[75] Inventor: Elmer E. Ward, Lake Forest, Ill.
[73] Assignee: F. P. Smith Corporation, Melrose Park, Ill.
[22] Filed: Apr. 28, 1972
[21] Appl. No.: 248,695

[52] U.S. Cl.............. 210/168, 210/223, 210/445
[51] Int. Cl..................... F01m 11/00, B01d 35/06
[58] Field of Search................... 210/223, 454, 455, 210/168, 416, 445

[56] References Cited
UNITED STATES PATENTS

| | | | |
|---|---|---|---|
| 3,371,793 | 3/1968 | Fowler | 210/168 X |
| 3,463,729 | 8/1969 | Bean | 210/168 X |
| 3,014,592 | 12/1961 | Stephens | 210/416 X |
| 3,211,291 | 10/1965 | Teutsch | 210/223 X |
| 3,400,832 | 9/1968 | Cooper | 210/223 |

Primary Examiner—Samih N. Zaharna
Assistant Examiner—T. A. Granger
Attorney—Humer, Clement, Brinks, Willian, Olds & Cook

[57] ABSTRACT

An automatic transmission fluid filter having an outlet port for supplying filtered fluid to the intake of an automatic transmission and including a filtering medium which is held by a support means. A cavity is formed between the filtering medium and the support means with the cavity receiving filtered automatic transmission fluid which has passed through the filtering medium. A magnetic material surrounds the outlet port and attracts magnetic particles in the filtered fluid and is positioned out of the direct flow of the filtered fluid to prevent the washing away of magnetic particles attracted to the magnetic material.

8 Claims, 6 Drawing Figures

PATENTED JAN 8 1974 3,784,011

AUTOMATIC TRANSMISSION FLUID FILTER

Generally, the invention relates to an automatic transmission fluid filter for use with an automatic transmission. More particularly, the invention relates to an automatic transmission fluid filter having a magnetic means for removing particles from the automatic transmission fluid being filtered.

The hydraulic system in an automatic transmission functions both to control the operation of the transmission and to provide power transfer in the transmission. In the hydraulic system, the transmission fluid serves as the medium for transmitting power in the torque convertor of the transmission as well as the medium for providing feed back and control to a system of valves, governors and vacuum devices in the transmission. The transmission fluid also serves as a lubricant to minimize wear due to friction in the transmission and is essential for the smooth and prolonged operation of the precision ground valves and other components in the transmission. The transmission fluid also serves as a cooling agent to prevent the transmission from exceeding the designed operating temperatures.

In order to provide proper control and power transfer as well as essential lubrication in an automatic transmission the hydraulic transmission fluid must be free of contaminants which are typically in the form of dirt, metal shavings, clutch facings, gum, and varnish. The presence of contaminants in the hydraulic transmission fluid results in sticking of the precision control valves and other mechanisms in the transmission and prevents adequate lubrication from being provided to the components in the transmission.

In the operation of an automatic transmission needle-shaped metal particles are typically produced and become suspended in the hydraulic transmission fluid. These needle-shaped particles can pierce the filtering material in conventional automatic transmission fluid filters and become ingested into the hydraulic system of the automatic transmission thereby causing severe damage to the hydraulic system and other portions of the transmission. Therefore, it is an object of the present invention to provide an automatic transmission fluid filter for trapping needle-shaped metal particles produced by an automatic transmission.

In order to increase the filtering action of a filter, the porosity of the filter can be decreased to retard further the passage of contaminants. However, as the porosity of the filter is decreased, the flow of fluid through the filter becomes more difficult and a greater pressure is required to draw fluid through the filter. In the case of an automatic transmission fluid filter this can result in hydraulic fluid starvation in the automatic transmission and cavitation in the automatic transmission. Therefore, it is an object of the present invention to provide an automatic transmission fluid filter having a high filtering action and presenting a low resistance to fluid flow, thus requiring low pressure for operation of the filter.

Another object of the invention is to provide a magnetic means in an automatic transmission filter which is positioned so that the fluid flowing out of the fluid filter and into the automatic transmission passes within the range of magnetic attraction of the magnetic means. However, the magnetic means is positioned so that the fluid flowing out of the filter does not directly impinge on the magnetic means, thus preventing particles attracted to the magnetic means from being washed away by the fluid.

These and other aspects of the invention are described in the detailed description and the drawings which demonstrate representative forms of the invention, in which drawings.

Figure 1:
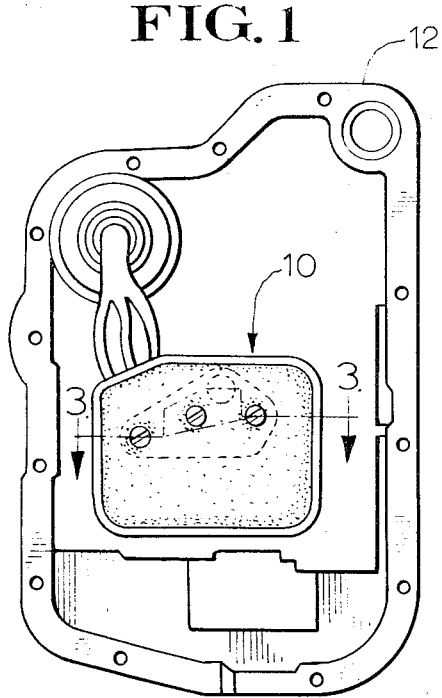
FIG. 1 shows an automatic transmission fluid filter, embodying the present invention, assembled onto a conventional automatic transmission.

Referring to FIG. 1, an automatic transmission fluid filter embodying the present invention and indicated generally by the numeral 10 is shown assembled on an automatic transmission 12. The automatic transmission 12 includes a sump pan which has been removed from the automatic transmission to illustrate the positioning of the fluid filter 10. The fluid filter 10 is positioned on the bottom of the automatic transmission 12 and mates with an intake port 14 (shown in FIG. 2) in the automatic transmission 12. Automatic transmission fluid is drawn from the sump pan into the fluid filter 10 and is ingested into the automatic transmission 12 through the intake port 14 for supplying the hydraulic system of the automatic transmission. Thus, the fluid filter 10 operates to provide a supply of filtered automatic transmission fluid for the hydraulic system of the automatic transmission 12.

Figure 2:
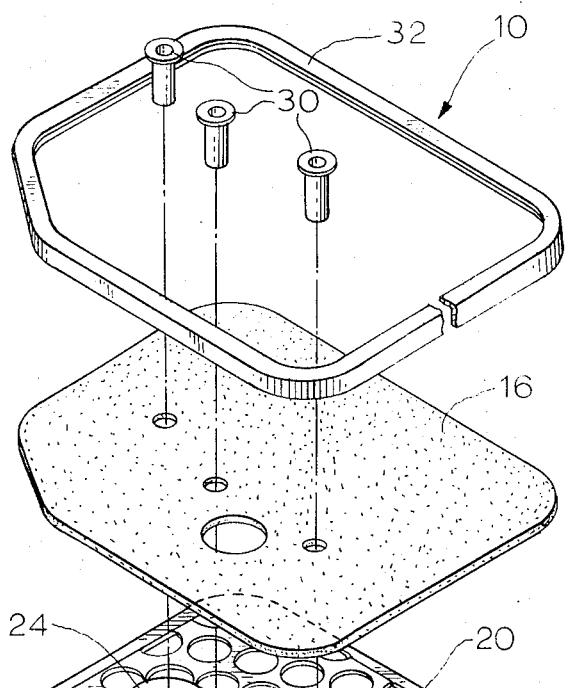
FIG. 2 is an exploded view of the automatic transmission fluid filter of FIG. 1.

Referring to FIG. 2, the fluid filter 10 includes a first filtering medium 16 and a second filtering medium 18 of a conventional construction. The filtering mediums 16 and 18 can be formed of a dacron-felt material or other suitable filtering material for removing contaminants from the automatic transmission fluid to be filtered.

A first apertured support grid 20 is provided for carrying the filtering medium 16 while a second apertured support grid 22 is provided for carrying the filtering medium 18. The support grids 20 and 22 are constructed in a conventional manner to permit passage of automatic transmission fluid through the filtering mediums 16 and 18 into a cavity 36 (shown in FIG. 3) formed between the support grids 20 and 22.

The support grid 20 has a solid shield 24 which surrounds an outlet port 26 and provides a dead-zone around the outlet port 26 to prevent flow of automatic transmission fluid into the cavity 36 of the fluid filter 10 adjacent the outlet port 26. The outlet port 26 is utilized to supply filtered automatic transmission fluid to the automatic transmission 12. A magnetic material 28 is positioned on the solid shield 24 of the support grid 20 on the side of the support grid 20 away from the filtering medium 16. The magnetic material 28 is preferably in the form of a sheet and conforms to the area of the solid shield 24 although other shapes can be utilized for the magnetic material 28.

The fluid filter 10 is held in an assembled position by a plurality of rivets 30 which are aligned with the fluid filter 10, as shown in the drawings. A band 32 extends around the periphery of the fluid filter 10 and is bent into a U-shape, as detailed, to hold the elements of the fluid filter 10 together in cooperation with the rivets 30.

Figure 3:
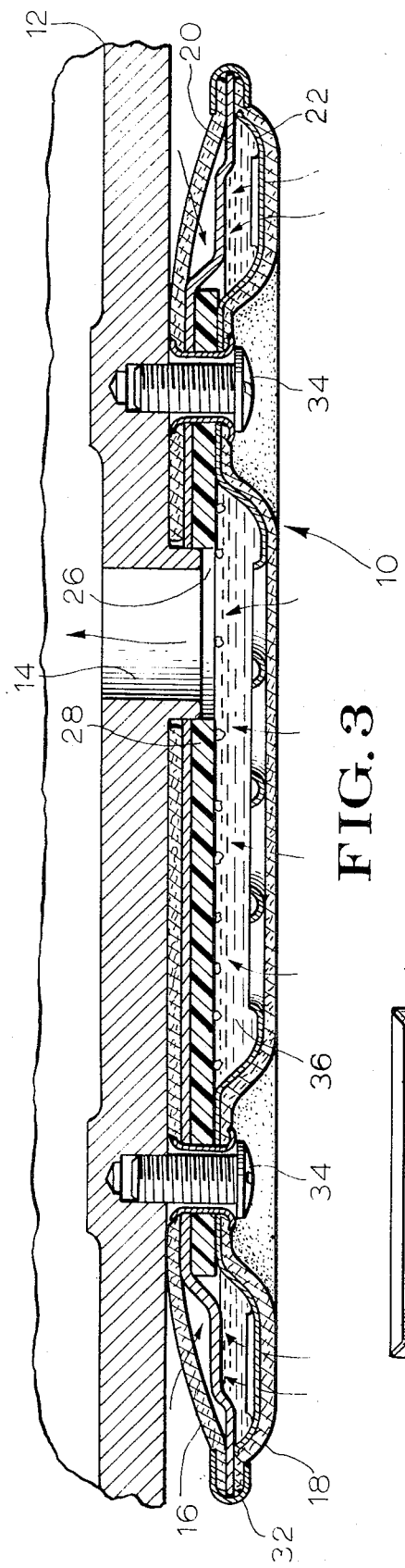
FIG. 3 is a sectional view taken along line 3—3 of FIG. 1.

Referring to FIG. 3, the fluid filter 10 is preferably attached to the automatic transmission 12 by screws 34 although other types of fasteners can be utilized to attach the fluid filter 10 to the automatic transmission 12. The support grids 20 and 22 are assembled in a spaced-apart relationship to provide a cavity 36 for receiving filtered fluid from the filtering mediums 16 and 18. The fluid filter 10 is held in an assembled position by the rivets 30 and the band 32 which engages the peripheral portion of the filtering mediums 16 and 18 as shown in the drawings.

In the operation of the fluid filter 10, automatic transmission fluid flows through the filtering medium 16 and passes through the apertured grid 20 into the cavity 36. Also, automatic transmission fluid flows through the filtering medium 18 and passes through the apertured grid 22 into the cavity 36. The filtered automatic transmission fluid in the cavity 36 will have most of the contaminants removed by the filtering mediums 16 and 18. The filtered automatic transmission fluid in the cavity 36 then exits through the outlet port 26 into the automatic transmission 12. As the filtered automatic transmission fluid flows from the cavity 36 through the outlet port 26 the filtered fluid passes near the magnetic material 28 and magnetic particles in the filtered fluid which were not removed by the filtering mediums 16 and 18 are attracted to the magnetic material 28.

The filtered automatic transmission fluid flowing from the cavity 36 and out the outlet port 26 does not impinge directly on the magnetic material 28 and magnetic particles which are attracted to the magnetic material 28 are not washed away by the filtered fluid leaving the cavity 36 through the outlet port 26. However, the filtered fluid exiting the cavity 36 through the outlet port 26 and into the automatic transmission 12 passes in close proximity to the magnetic material 28 since the magnetic material surrounds the outlet port 26. Thus, the positioning of the magnetic material 28 causes the filtered automatic transmission fluid exiting the cavity 36 to pass within the range of magnetic attraction of the magnetic material 28 without allowing the filtered fluid to wash away particles which have been attracted to the magnetic material 28.

Figure 4:
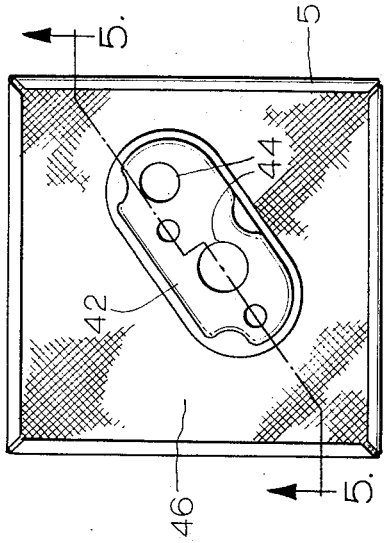
FIG. 4 is a top view of another form of automatic transmission fluid filter embodying the present invention.

Referring to FIG. 4, a modified form of an automatic transmission fluid filter embodying the present invention is indicated generally by the numeral 40. The modified fluid filter 40 includes a cap 42 having a pair of outlet ports 44 for supplying filtered automatic transmission fluid to an automatic transmission (not shown) of a conventional type which has a pair of intake ports and is in other respects similar to the automatic transmission 12. The modified fluid filter 40 includes a filtering medium 46 which preferably is formed from a fine mesh wire screen of a conventional type. However, the filtering medium 46 can be formed from other types of filtering materials as can the filtering mediums 16 and 18 and the practice of invention is not limited to the use of a particular type of filtering material. The filtering medium 46 is carried by a support structure 48 which encloses the bottom of the fluid filter 14, as later detailed, to provide a cavity 58 (shown in FIG. 5).

Thus, the modified fluid filter 40 has a filtering medium on the top side only, in contrast to the fluid filter 10 which has a filtering medium on both the top and bottom sides thereof.

Figure 6:
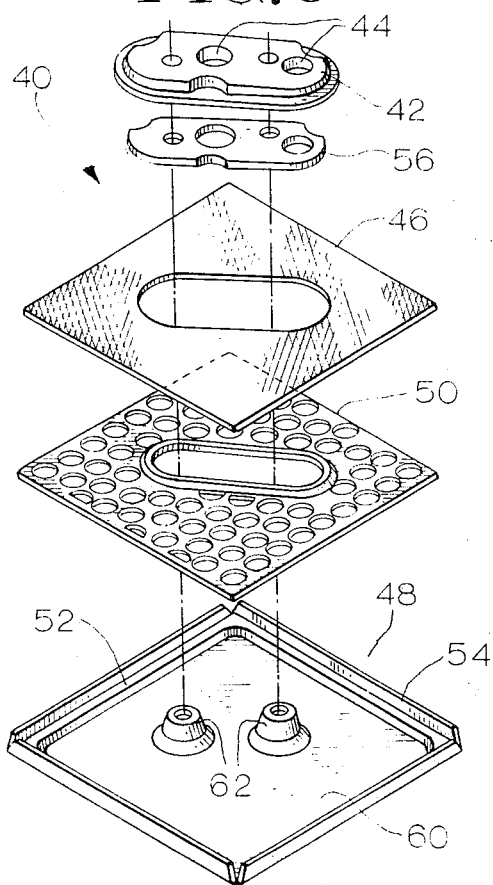
FIG. 6 is an exploded view of the automatic transmission fluid filter of FIG. 4.

Referring to FIG. 6, the modified fluid filter 40 includes an apertured support grid 50 for carrying the filtering medium 46. The apertured support grid 50 rests on a shoulder 52 of the support structure 48 and cooperates with the support structure 48 to form a support means for the filtering medium 46. A lip 54 on support structure 48 is utilized for holding the filtering medium 46 and the support grid 50 in place on the shoulder 52. In the assembly of the modified fluid filter 40, the lip 54 is bent to engage the peripheral portion of the filtering medium 46 and thereby hold the filtering medium 46, and the support grid 50 on the shoulder 52 of the support structure 48.

A magnetic material 56 is placed on the under side of the cap 42 adjacent the cavity 58 (shown in FIG. 5) formed between the apertured support grid 50 and a bottom plate 60 of the support structure 48. Raised supports 62 are formed on the bottom plate 60 of the support structure 48 to support the cap 42 and the magnetic material 56 when the modified fluid filter 40 is assembled, as shown in FIG. 5.

The cap 42 serves as a shield and prevents passage of automatic transmission fluid into the cavity 58 adjacent the outlet ports 44. Thus, the cap 42 provides a dead-zone for fluid flow into the cavity 58 of the modified fluid filter 40 as does the solid shield 24 in the fluid filter 10. The magnetic material 56 is positioned on the cap 42 and surrounds the outlet ports 44 in much the same manner as the magnetic material 28 is positioned on the solid shield 24 in the fluid filter 10.

Figure 5:
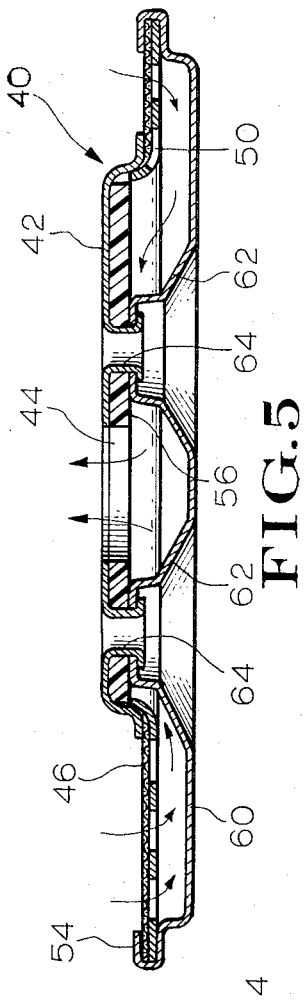
FIG. 5 is a sectional view taken along line 5—5 in FIG. 4.

Referring to FIG. 5, the modified fluid filter 40 is retained in an assembled position by the lip 54 of the support structure 48 and extensions 64 of the cap 42. The extensions 64 are formed by depressing material from the cap 42 into the raised supports 62 to form a rivet type connection with the raised supports 62. However, it will be appreciated that other means could be utilized to fasten the cap 42 to the raised supports 62. The lip 54 engages the filtering medium 46 and the support grid 50 around the peripheral portion thereof to complete the assembly.

In the operation of the modified fluid filter 40, automatic transmission fluid flows through the filtering medium 46 and passes through the apertured support grid 50 into the cavity 58. The filtered automatic fluid in the cavity 58 then exits through the outlet ports 44 to the associated automatic transmission (not shown) which is utilized with the modified fluid filter 40. As the filtered fluid leaves the cavity 58 through the pair of outlet ports 44, the filtered fluid passes near the magnetic material 56 and magnetic particles in the filtered fluid which were not removed by the filtering medium 46 come within the range of magnetic attraction of the magnetic material 58 and are attracted to the magnetic material 56.

The filtered fluid flowing out of the pair of outlet ports 44 does not impinge directly upon the magnetic material 56 and particles which have been attracted to the material 56 are not washed away by the action of the filtered fluid exiting through the pair of outlet ports 44. However, the filtered fluid exiting the cavity 58 through the outlet ports 44 and into the associated automatic transmission passes in close proximity to the magnetic material 56 since the magnetic material surrounds the outlet ports 44. Thus, the positioning of the magnetic material 44 causes the filtered automatic transmission fluid exiting the cavity 58 to pass within the range of magnetic attraction of the magnetic material 56 without allowing the filtered fluid to wash away particles which have been attracted to the magnetic material 56.

The bottom plate 60 of the support structure 48 prevents drawing of automatic transmission fluid from below the modified fluid filter 40. This prevents sediment which has accumulated in the sump pan of the associated automatic transmission from being drawn into the modified fluid filter 40 and permits the modified fluid filter to be positioned closer to the sump pan of the associated automatic transmission.

It is to be understood that various modifications can be made to the disclosed automatic transmission fluid filter without departing from the scope of the invention, and it is intended to cover in the appended claims all such modifications as fall within the true spirit and scope of the invention.

What is claimed is:

1. An automatic transmission fluid filter for use within the housing of an automatic transmission having an intake port for ingesting automatic transmission fluid comprising:
   a filtering medium for removing contaminant material from automatic transmission fluid;
   support means for carrying said filtering medium, said support means permitting passage of automatic transmission fluid through said filtering medium into
   a cavity formed between said filtering medium and a portion of said support means, said cavity receiving filtered automatic transmission fluid having passed through said filtering medium;
   outlet port means comprising an opening in said support means for supplying filtered automatic transmission fluid to said intake port of said automatic transmission; and
   magnetic means for attracting magnetic particles in said filtered automatic transmission fluid, said magnetic means being affixed to said support means within said cavity and surrounding said opening comprising said outlet port means and having magnetic forces extending into filtered automatic transmission fluid exiting said outlet port means.

2. An automatic transmission fluid filter in accordance with claim 1 wherein said magnetic means is positioned away from a direct flow of said filtered automatic transmission fluid exiting said outlet port means to prevent washing away of magnetic particles attracted to said magnetic means by said filtered automatic transmission fluid exiting said outlet port means.

3. An automatic transmission fluid filter in accordance with claim 1 including a solid shield arranged around said opening in said support means comprising said outlet port means, said solid shield providing a dead zone to prevent passage of automatic transmission fluid through the filter medium overlying said solid shield into said cavity around said outlet port means.

4. An automatic transmission fluid filter in accordance with claim 3 wherein said magnetic means is affixed to said solid shield arranged around said opening in said support means comprising said outlet port means.

5. An automatic transmission fluid filter in accordance with claim 1 wherein said support means for carrying said filtering medium includes an apertured grid for engaging said filtering medium, said apertured grid permitting passage of automatic transmission fluid through said filtering medium into said cavity.

6. An automatic transmission fluid filter in accordance with claim 5 wherein said support means for holding said filtering medium includes a bottom plate spaced apart from said apertured grid, said bottom plate engaging a peripheral portion of said filtering medium, said cavity being formed between said apertured grid and said bottom plate.

7. An automatic transmission fluid filter in accordance with claim 1 wherein said support means for carrying said filtering medium includes a first apertured grid and a second apertured grid, said grids being positioned in a spaced apart relationship; and said filtering medium includes a first filter overlying said first apertured grid and a second filter overlying said second apertured grid.

8. An automatic transmission fluid filter in accordance with claim 7 including band means for retaining said first and second filters and said first and second apertured grids in an assembled position, said band means engaging a peripheral portion of said first and second filters.

* * * * *